United States Patent
Kelman et al.

(10) Patent No.: US 6,776,944 B2
(45) Date of Patent: Aug. 17, 2004

(54) METHOD FOR APPLYING BSR ELASTOMER

(75) Inventors: Josh Kelman, Rochester, MI (US);
Brian Pour, St. Clair Shores, MI (US);
Ed Shortridge, Taylor, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/322,585

(22) Filed: May 28, 1999

(65) Prior Publication Data

US 2001/0033042 A1 Oct. 25, 2001

(51) Int. Cl.[7] ............................................... B29C 47/02
(52) U.S. Cl. ....................... 264/138; 264/249; 264/267; 264/274; 264/296; 425/113; 425/289
(58) Field of Search ................................. 264/138, 249, 264/267, 274, 296; 425/113, 289; 156/153, 304.5, 304.2, 304.3; 428/31

(56) References Cited

U.S. PATENT DOCUMENTS

| | | | |
|---|---|---|---|
| 2,770,386 A | * 11/1956 | Mitchell et al. ............... 220/4 |
| 3,477,759 A | 11/1969 | Simpson et al. | |
| 3,635,117 A | 1/1972 | Nagao | |
| 4,008,551 A | 2/1977 | MacDonald et al. | |
| 4,124,676 A | * 11/1978 | Henzl .......................... 264/250 |
| 4,993,897 A | * 2/1991 | Anderhalden ................ 409/180 |
| 5,340,425 A | 8/1994 | Strapazzini | |
| 5,810,406 A | * 9/1998 | Reid et al. ................... 293/128 |
| 5,899,251 A | * 5/1999 | Turner .......................... 144/347 |

* cited by examiner

Primary Examiner—Edmund H. Lee
(74) Attorney, Agent, or Firm—Grossman Tucker Perreault & Pfleger, PLLC

(57) ABSTRACT

A method for mounting interior vehicle trim parts in which two trim parts are supported adjacent one another and in which a bead of buffer material is disposed between mating surfaces of the two trim parts. The bead is included to reduce noises such as buzzes, squeaks and rattles produced by contact and relative motion between the first and second trim parts at their mating surfaces. The bead is mechanically locked into a recess in one of the mating surfaces by forming a recess in the mating surface then applying buffer material in the recess. The buffer material is applied in such a way as to form the bead. The bead is allowed to mechanically connect to the first trim part as a result of the hardening of the buffer material within the recess.

8 Claims, 4 Drawing Sheets

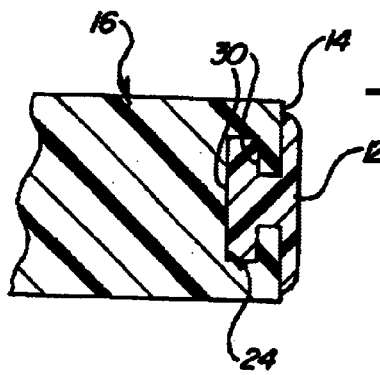
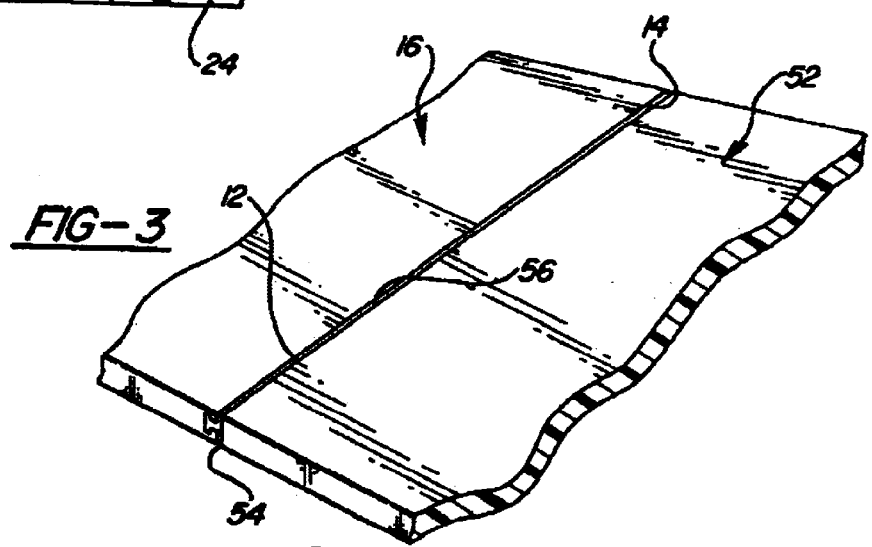
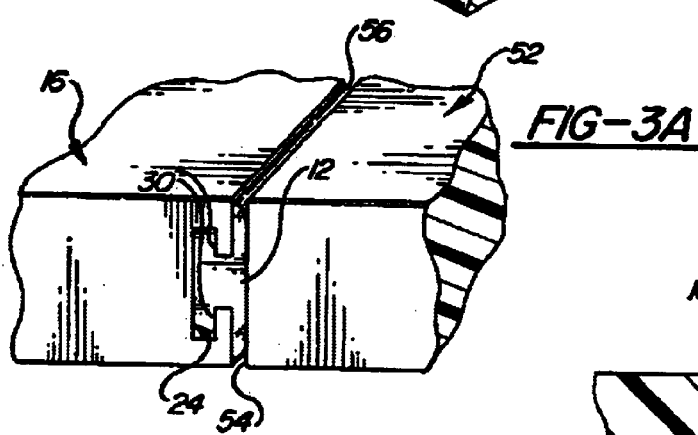
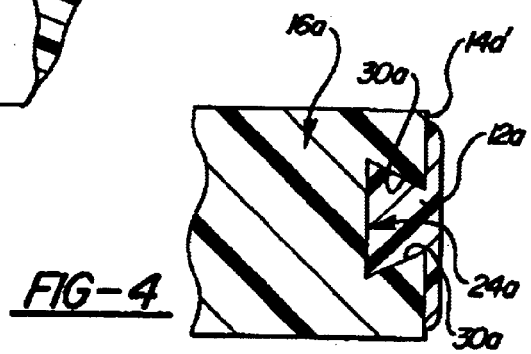

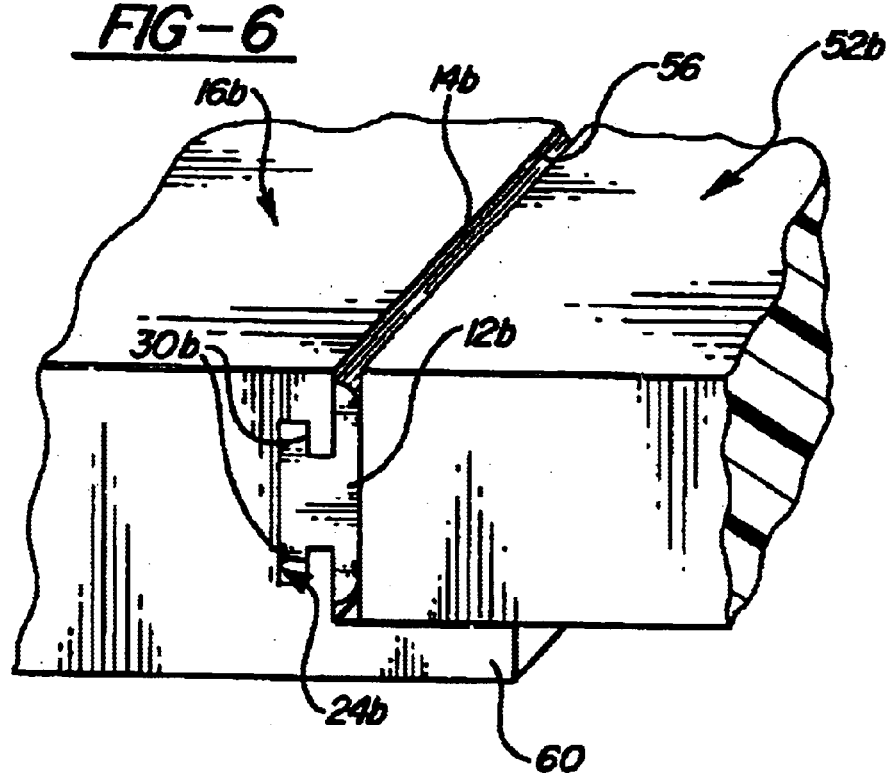
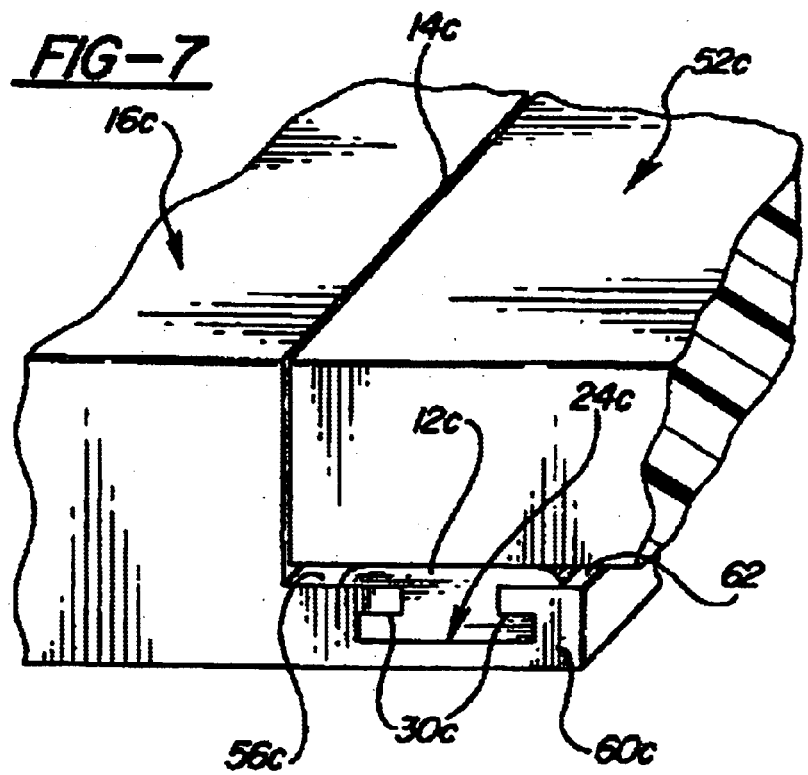

METHOD FOR APPLYING BSR ELASTOMER

TECHNICAL FIELD OF THE INVENTION

This invention relates generally to automotive trim parts and, more particularly, to a sound deadening method for reducing noises such as buzzes, squeaks and rattles that are generated by adjacent trim parts rubbing together.

INVENTION BACKGROUND

Motor vehicles commonly include interior trim components such as switch plate bezels, demisters, light housings, speaker covers, decorative appliques, storage compartments and the like that are attached within portions of interior trim panel surfaces of such vehicles. Examples of trim panels that such components are commonly installed in include instrument panels, door panels, headliners, package trays, seats and center consoles. The trim panels are often made of laminated material and include an outer layer that displays a decorative appearance. Adjacent trim panels are usually designed to fit together closely or to partially overlap with only a narrow seam separating them.

This close fit between trim panels and components mounted in the panels or between adjacent trim panels often results in noises, such as buzzes, squeaks and rattles, that result from contact and relative motion between surfaces of edges of adjacent trim parts. This noise is sometimes referred to as BSR (buzz, squeak, rattle) or NVH (noise, vibration, harshness). To mitigate the BSR/NVH problem, some production automobile assemblies apply a buffer material in the form of flat adhesive-backed tape (BSR tape) to one or both mating surfaces (typically panel edges) between adjacent trim parts. However, the tape application process is labor-intensive and can result in exposed tape that vehicle occupants can see, thus detracting from the finished appearance of a vehicle interior.

To reduce labor requirements and improve quality, some systems apply buffer material in the form of extruded elastomers rather than tape. The buffer material is extruded onto the mating surface and/or surfaces by an applicator in the form of an extruder head and allowed to cure before assembly. In some such systems extruder head movement is robotically controlled. One problem with adapting these systems to use in applying buffer material to automotive trim is that it is difficult to adhere elastomers to all the materials used to form automotive trim components and panels. Trim assemblies sometimes include mating trim parts that are made of several different materials, e.g., PVC, PP, PC/ABS, ABS, paint, wood, textiles, etc. It would be difficult to provide a robotic applicator system that could cost-effectively apply different buffer materials to all these different trim materials. To do so would likely require either multiple robotic applicators, each applying a different buffer material, or a single applicator capable of rapidly and repeatedly changing the type of buffer material it applies.

It is known to augment the holding power of hot melt adhesives by applying such adhesives to a groove in such a way as to form a mechanical as well as an adhesive bond between adjacent parts. For example, U.S. Pat. No. 3,635,117 issued to Nagao on Jan. 18, 1972 discloses a method for fixing a woodwind instrument. The method includes the step of forming a groove in an outer surface of the instrument and a corresponding groove in an inner surface of a repair ring shaped to fit around the instrument. Hot melt adhesive is then introduced into the groove in the instrument and onto adjacent surfaces of the instrument. The ring is then joined to the instrument such that the grooves are facing one another. The adhesive is then heated into a melted state. When the adhesive cools and cures it provides both an adhesive bond between the parts and a mechanical lock against shear forces where it has dried within the facing grooves. The Nagao patent does not disclose how the instrument is grooved or how the adhesive is applied.

What is needed is a sound deadening method for interior vehicle trim parts that can provide a bead of a single buffer material between adjacent parts by applying the bead to one or both vehicle interior trim parts even where the parts have differing material compositions. What is also needed is apparatus configured apply the buffer material.

INVENTION SUMMARY

A method is provided for mounting interior vehicle trim parts in which a first trim part is supported adjacent a second trim part and in which a bead of buffer material is mechanically locked into a recess in one of the first and second trim parts. The bead is included to reduce noises such as buzzes, squeaks and rattles that might otherwise be produced by contact and relative motion between the first and second trim parts. According to the method, the first trim part is provided having a mating surface configured to lie alongside a mating surface of the second trim part when the first and second trim parts are supported adjacent one another in a vehicle. The recess is then formed in the mating surface of the first trim part and the buffer material is provided in the recess. The buffer material is provided in such a way as to provide a bead of buffer material on the mating surface of the first trim part. The bead is allowed to mechanically connect to the first trim part because of the hardening of the buffer material within the recess.

The first and second trim parts are then supported adjacent one another with the second trim part contacting the bead of buffer material.

According to another aspect of the inventive method, the recess is formed to include an undercut to more positively lock the hardened buffer material onto the mating surface of the first trim part.

According to another aspect of the inventive method, the buffer material preferably comprises an elastomeric material. A suitable elastomeric buffer material is preferably selected from a group consisting of thermoplastic elastomers (TPEs) and thermosetting elastomers. Thermoplastic urethane (TPU) is a preferred form of TPE to be used as the buffer material.

According to another aspect of the inventive method, buffer material is provided in the recess by providing an applicator comprising an extrusion head and extruding buffer material through the extrusion head and into the recess.

According to another aspect of the inventive method, in forming the recess a robot is operatively connected to a recess-forming tool and the robot is operated in such a way as to move the forming tool into and along the mating surface of the first trim part.

According to another aspect of the inventive method, in providing buffer material a robot is provided that is operatively connected to an applicator. A source of buffer material is connected to the applicator such that the buffer material is in fluid communication with the applicator. The robot is then operated in such a way as to move the applicator in spaced generally parallel relationship with the mating surface of the first trim part while projecting buffer material into the recess and onto the mating surface.

According to another aspect of the inventive method, in providing the buffer material an applicator is operatively connected to the robot adjacent the recess-forming tool. A source of buffer material is then connected to the applicator in such a way as to be in fluid communication with the applicator. The robot is then operated in such a way as to simultaneously move the forming tool into and along the mating surface of the first trim part while moving the applicator in spaced generally parallel relationship with the mating surface and in trailing relationship to the recess-forming tool. The trailing applicator provides buffer material in the recess formed by the preceding forming tool, overfilling the recess and providing a bead of buffer material on the mating surface of the first trim part.

According to another aspect of the inventive method, the forming tool provided includes a router having a router bit configured to form a recess of desired cross sectional shape.

According to another aspect of the inventive method, the second trim part is configured to be mounted in an opening in the first trim part, the mating surface of the second trim part being an outer peripheral edge of the second trim part. Likewise, the mating surface of the first trim part is an inner edge of the first trim part that surrounds and defines the opening in the first trim part.

Also according to the invention, a bead forming apparatus is provided for forming a bead of buffer material on a mating surface of an automotive trim part according to the above method. The bead forming apparatus comprises a recess-forming tool and an applicator on a common mount. The recess-forming tool is configured to form a recess in the mating surface. The applicator is configured to provide buffer material in the recess and to form a bead on the mating surface by overfilling the recess. A drive is operatively connected to the common mount and is configured to move the recess-forming tool and the applicator simultaneously with respect to the mating surface with the applicator trailing the recess-forming tool. A source of buffer material is in fluid communication with the applicator and is configured to supply the buffer material to the applicator. By mounting both the recess-forming tool and the applicator on the same mount and driving them together, the recess may be formed and the buffer material applied in the same manufacturing step.

According to another aspect of the invention, the recess-forming tool is configured to form a recess that includes an undercut. The undercut provides a secure mechanical lock between the bead and the mating surface.

According to another aspect of the invention, the forming tool comprises a router. The router efficiently forms the recess and the undercut in one operation.

According to another aspect of the invention, the applicator comprises an extruder head configured to extrude buffer material into the recess and onto the mating surface.

According to another aspect of the invention, the drive includes a robot having a multi-axis drive system. The robot and drive system provide accurate, consistent application resulting in the formation of a uniform bead.

According to another aspect of the invention, the recess-forming tool and applicator are mounted on an arm of the robot. The arm allows the robot to move the recess-forming tool and applicator along mating surfaces of a variety of shapes and sizes.

According to another aspect of the invention, the applicator is movably mounted relative to the recess-forming tool. In addition, the robot multi-axis drive system is configured move the applicator independent of the recess-forming tool while simultaneously moving the recess-forming tool and the applicator along the mating surface. This allows the applicator to be positioned, to a certain extent, independently from the recess-forming tool. This results in greater control over bead size and placement.

BRIEF DRAWING DESCRIPTION

To better understand and appreciate the invention, refer to the following detailed description in connection with the accompanying drawings:

FIG. 2 is a partial cross-sectional end view of the trim part of FIG. 1;

FIG. 3 is a partial perspective view of a second trim part mounted adjacent the trim part of FIG. 1 with the bead of FIG. 1 sandwiched between;

FIG. 3A is a magnified view of one end of a junction between the second trim part and the trim part of FIG. 1;

FIG. 4 is a partial cross-sectional end view of the trim part of FIG. 1;

FIG. 6 is a partial perspective view of a lap joint of two trim parts with a bead disposed between mating edges of the two trim parts; and FIG. 7 is a partial perspective view of a lap joint of two trim parts with a bead disposed between an elongated lap flange of one trim part and a side surface of the other trim part.

PREFERRED EMBODIMENT DESCRIPTION

Figure 1:
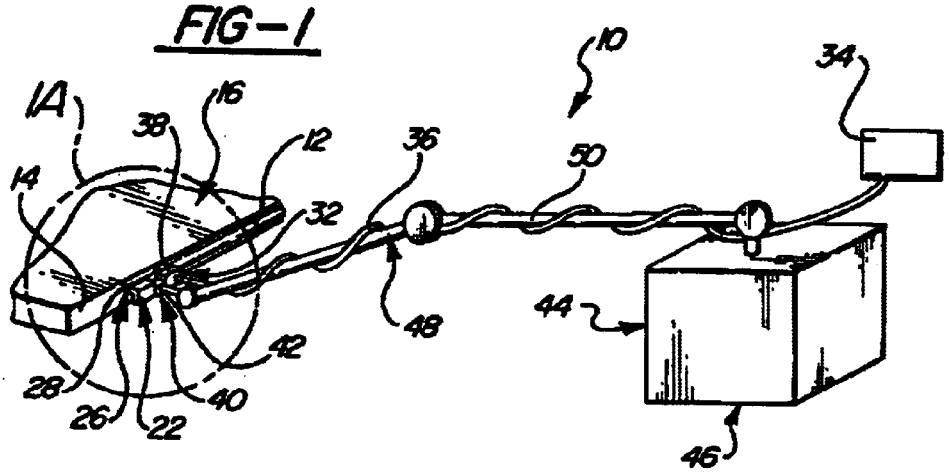
FIG. 1 is a schematic perspective view of a bead forming apparatus constructed according to the invention and shown forming a bead on a mating edge of a trim part.
Figure 1A:
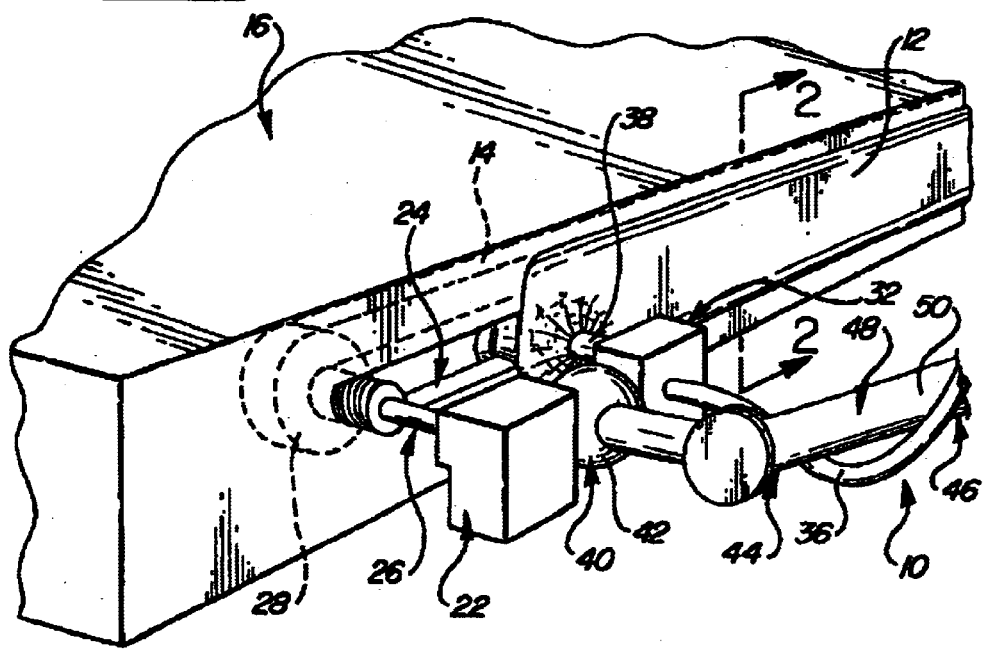
FIG. 1A is a schematic magnified view of the portion of FIG. 1 enclosed by circle A.
Figure 5:
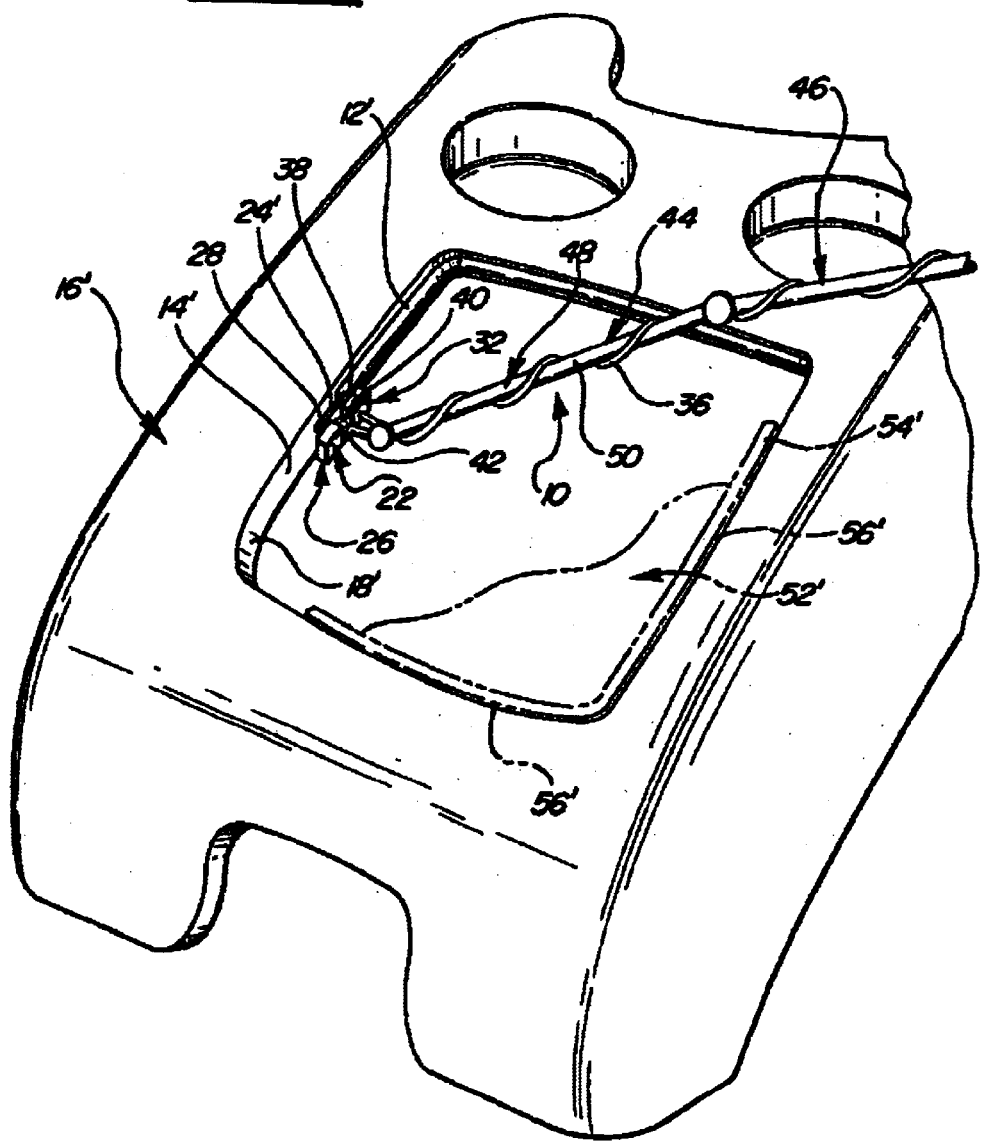
FIG. 5 is a partial perspective schematic view of the bead forming apparatus of FIG. 1 and shown forming a bead along an inner edge defining an opening in a trim part with a cut-away portion of a second trim part shown in phantom mounted within the opening.

A bead forming apparatus constructed according to the invention is generally shown at 10 in FIGS. 1, 1A and 5. The bead forming apparatus 10 is operable to form a bead 12 of buffer material on the mating surface 14 of a first automotive trim part 16. As shown in FIGS. 1–3A, the first trim part 16 may be a trim panel of generally uniform thickness with the mating surface 14 comprising at least one peripheral outer edge 18. Alternatively, as shown in FIG. 5, the first trim part may be a trim panel 16' of generally uniform thickness with its mating surface 14' comprising at least one inner edge 18' defining an opening 20 in the trim panel 16'.

The bead forming apparatus 10 comprises a recess-forming tool generally indicated at 22 in FIGS. 1, 1A and 5. The recess-forming tool 22 is configured to form a recess 24, in the mating surface 14 of the first trim part 16 as is most clearly shown in the magnified view of FIG. 1A. The forming tool 22 comprises a router generally indicated at 26 in FIGS. 1, 1A and 4. The router sectional shape, i.e.; a recess 24 having undercuts 30. As best shown in FIGS. 2 and 3A the forming tool 22 cuts the recess 24 in the form of a keylock type groove having a T-shaped cross section of uniform size and shape along its length. The recess-forming tool 22 may alternatively employ other suitable types of cutting tools known in the art resulting in grooves having different shapes. For example, as shown in FIG. 4, the bead forming apparatus may be configured to cut a recess 24a having a dove-tail cross-sectional shape along its length. (Structures shown in FIG. 4 that correspond to similar or identical structures in FIG. 3A are referenced by the same reference numerals but with the suffix "a".)

As shown in FIGS. 6 and 7, the recess forming tool 22 can also be configured to form a recess 24b, 24c in a mating surface 14b, 14c of a trim part 16b, 16c that includes a lap joint flange 60, 60c. (Structures shown in FIGS. 6 and 7 that correspond to similar or identical structures shown in FIG. 3 or 3A are referenced by the same reference numerals only with the suffixes "b" and "c", respectively). As shown in FIG. 6, a recess 24b may, similar to recess 24 of FIGS. 3 and 3A, still be formed in a mating surface 14b disposed on a peripheral edge of trim part 16b. However, as shown in FIG. 7, a recess 24c may alternatively be formed in a mating surface 62 of the lap joint flange 60c.

The bead forming apparatus 10 also includes an applicator generally indicated at 32 in FIGS. 1, 1A and 5. The applicator 32 is configured to provide buffer material in the recess 24 and to form a raised portion or bead 12 on the mating surface 14 by overfilling the recess 24. A source of buffer material is shown at 34 in FIG. 1. The source 34 of buffer material is in fluid communication with the applicator 32 and is configured to supply the buffer material to the applicator 32 through a hose shown at 36 in FIGS. 1, 1A and 5.

The source 34 of buffer material is also configured to force the buffer material through the applicator 32 and onto the mating surface 14 of the first trim part 16. The applicator 32 comprises an extruder head shown at 38 in FIGS. 1, 1A and 5. The extruder head 38 is configured to extrude the buffer material into the recess 24 and onto the mating surface 14 of the first trim part 16. The bead forming apparatus 10 may alternatively include other suitable apparatus capable of providing buffer material in the recess 24 and forming the bead 12 on the mating surface 14.

The buffer material may comprise any one or more of a number of different materials including thermoplastic elastomers (TPEs) and thermosetting elastomers. Thermoplastic urethane (TPU) is a preferred form of TPE to be used as the buffer material. The buffer material may alternatively include other suitable materials not considered to be elastomers, but that are still capable of reducing BSR between adjacent trim parts.

A common mount shown at 40 in FIGS. 1, 1A and 5 supports both the recess-forming tool 22 and the applicator 32. The mount 40 includes a knuckle 42 disposed between the applicator 32 and the recess-forming tool 22. The knuckle 42 allows the applicator 32 to be moved, to a certain degree, independently of the recess-forming tool 22. The applicator 32 is, therefore, movably mounted relative to the recess-forming tool 22 and can be independently adjusted to extrude the buffer material in a variety of directions relative to the path of the applicator 32 over the mating surface 14 of the first trim part 16. In other embodiments a structure other than a knuckle may be used to provide relative motion between the applicator 32 and the recess-forming tool 22.

A drive is operatively connected to the mount 40 and is configured to move the recess-forming tool 22 and the applicator 32 simultaneously with respect to the mating surface 14 with the applicator 32 trailing the recess-forming tool 22. The drive, generally indicated at 44 in FIGS. 1, 1A and 5, includes a robot 46 having a multi-axis drive system 48. The recess-forming tool 22 and applicator 32 are mounted on an articulated arm 50 of the multi-axis drive system 48. In addition, the robot multi-axis drive system 48 is configured to move the applicator 32 independent of the recess-forming tool 22 while simultaneously moving the recess-forming tool 22 and the applicator 32 along the mating surface 14. This allows the drive system 48 to automatically change applicator aim "on the fly", i.e., as the recess-forming tool 22 is forming the recess 24 and the applicator 32 is extruding and applying the buffer material. The ability to change applicator aim "on the fly" allows bead configuration and position to be altered in response to changes in factors such as mating surface width and desired bead thickness at various points along a given mating surface 14.

A method is provided for assembling interior vehicle trim parts such as the trim panels 16, 52 in FIGS. 3, 3A and 5 in which a first one 16 of the trim panels is mounted adjacent a second one 52 of the trim panels and a bead 12 of buffer material is provided between the first and second trim panels 16, 52. The bead 12 is included between the trim panels 16, 52 to reduce noises such as buzzes, squeaks and rattles produced by contact and relative motion such as vibration and sliding between the first and second trim parts 16, 52. The bead 12 may be applied by any suitable means such as the bead forming apparatus 10 described above and schematically shown in the drawings.

According to the method, the first trim panel 16 is formed by injection molding or by any other suitable method known in the art for producing such parts. Formation of the first trim panel 16 includes formation of the mating surface 14 on the first trim panel 16, i.e., the surface that is configured to lie alongside and complement a mating surface 54 of the second trim panel 52 when the first and second trim panels 16, 52 are mounted adjacent one another in a vehicle. The mating surfaces 14, 54 are shaped to complement one another in an edgewise, abutting relationship as shown, for example, in FIGS. 3 and 3A. The first and second trim panels 16, 52 are shaped so that, when mounted adjacent one another, their respective mating surfaces 14, 54 are separated by a generally uniform gap shown at 56 in FIGS. 3, 3A and 5. The gap 56 is of sufficient width to accommodate at least a thin bead 12 of buffer material.

The recess 24 is then formed in the mating surface 14 of the first trim panel 16. The recess 24 is formed to include two undercut portions 30 of the T-shaped cross-sectioned keylock-type groove described above and shown in FIGS. 2, 3, and 3A. A recess-forming tool 22 such as that described above may be used to form the recess 24.

To form the recess 24 a robot, such as the robot 46 described above and schematically shown in FIGS. 1, 1A and 5, may be operatively connected to the recess-forming tool 22. As described above, the tool 22 may be mounted at one end of the articulated arm 50 of the robot 46. The robot 46 is then operated in such a way as to move the forming tool 22 into and along the mating surface 14 of the first trim panel 16.

A material such as the above-described elastomeric buffer material is then provided in the recess 24. This may be done by providing an applicator such as the above-described applicator 32, and extruding buffer material into the recess 24 through an extruder head 38 of the applicator 32. The buffer material is extruded into the recess 24 in such a way as to overfill the recess 24 and provide a bead 12 of buffer material on the mating surface 14 of the first trim panel 16. As the buffer material fills the recess 24 it flows into and fills the undercut regions and hardens. By hardening in the undercut regions 30 the buffer material provides a positive mechanical lock between the bead 12 and the mating surface 14 of the first trim panel 16. In other words, the bead 12 mechanically connects to the first trim panel 16 because of the hardening of the buffer material within the recess 24. As used herein, "hardening" refers to an increase in viscosity, or, conversely, a decrease in flow characteristics.

A robot, such as the above-described robot 46, may be operatively connected to the applicator 32. The applicator 32 may be mounted at one end of an articulated arm 50 of the robot 46 adjacent the recess-forming tool 22 and in a trailing position as shown and described above. The source 34 of buffer material is connected to the applicator 32 such that the buffer material is placed in fluid communication with the applicator 32. The robot 46 is then operated in such a way as to simultaneously move the forming tool 22 into and along the mating surface 14 of the first trim panel 16 while moving the applicator 32 in spaced generally parallel relationship with the mating surface 14 and in trailing relationship to the recess-forming tool 22. The trailing applicator 32 provides buffer material in the recess 24 formed by the preceding forming tool 22, overfilling the recess 24 and providing a bead 12 of buffer material on the mating surface 14 of the first trim panel 16. In other embodiments, the applicator 32 and forming tool 22 may be mounted separately, e.g., on separate robot arms. After forming the bead 12, the forming tool 22 and applicator 32 are removed from the first trim panel 16, e.g., by operating the robot 46 in such as way as to move the forming tool 22 and applicator 32 to a position remote from the trim panel 16.

Finally, the second trim panel 52 is installed adjacent the first trim panel 16 such that the bead 12 is sandwiched and compressed between the respective mating surfaces 14, 54 of the trim panels 16, 52. The bead 12 may be formed in such a way as to completely or only partially fill the gap 56 between the mating surfaces 14, 54 of the mounted trim panels 16, 52. In any case, the bead 12 provides a noise-limiting material barrier and may serve as a cushion between the respective mating surfaces 14, 54 of the trim panel 16, 52.

In other embodiments, the "butt joint" depicted may be replaced with a "lap joint", tongue and groove, etc., or any other suitable joint configuration. As shown in FIG. 5, the first trim part 16' may comprise an opening 20 into which the second trim part 52' may be mounted. In this embodiment, trim part 16' is a trim panel while trim part 52' may be a trim component. A mating surface 54' of trim component 52' is disposed on an outer peripheral edge 56' of trim component 52'. Likewise, the mating surface 14' of trim panel 16' is disposed on an inner edge of trim panel 16' that surrounds and defines the opening 20 in trim panel 16'. This configuration is common in automotive trim panels that house trim components such as radios, CD players, HVAC controls, and the like.

In applying buffer material to trim parts configured as shown in FIG. 5, a recess 24' and bead 12' may be formed by operating a robot 46 to insert the forming tool 22 and applicator 32 into the opening 20 and moving them along and around the inner edge 18' of the first trim part 16'. Following bead application, the robot 46 is operated in such a way as to remove the forming tool 22 and applicator 32 from the opening 20. Alternatively, the buffer material may be attached to the outer edge 56' of the second trim part 52' by operating the robot 46 to move the forming tool 22 and applicator 32 along and around the outer edge 56' of the second trim part 52'. In either case, the first and second trim parts 16', 52' are then joined together sandwiching the bead 12' between the inner edge 18' of the first trim part 16' and the outer edge 56' of the second trim part 52'. As with the first embodiment, other types of joints may be used.

The inventive method and bead forming apparatus 10 eliminate several critical problems often encountered when using extruded elastomeric material as a BSR tape replacement. In addition to eliminating adhesion concerns, a system developed according to the invention will allow for the use of significantly lower cost elastomers since they do not have to be blended for adhesion properties.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims.

We claim:

1. A method to reduce noise between adjacent interior vehicle trim parts in which a first trim part is supported adjacent a second trim part and in which a bead of buffer material is provided between the first and second trim parts to reduce noises produced by contact and relative motion between the first and second trim parts, the method including the steps of:

providing the first and second trim parts, the first trim part having a peripheral mating edge configured to lie adjacent a peripheral mating edge of the second part when the first and second trim parts are supported adjacent one another and wherein said first and second trim parts are not adhered to one another;

forming a recess having an undercut portion in the peripheral mating edge of the first trim part after providing the first trim part, in which the step of forming a recess includes the steps of:

providing a robot operatively connected to a recess-forming tool; and operating the robot to move the forming tool into and along the mating edge of the first trim part:

providing buffer material in the recess and overfilling said recess, in which the step of providing buffer material includes the steps of:

providing a robot operatively connected to an applicator;

connecting a source of buffer material to the applicator, the buffer material being in fluid communication with the applicator; and operating the robot to move the applicator in spaced generally parallel relationship with the peripheral mating edge of the first trim part while projecting buffer material into the recess and onto the mating edge of the first trim part; and allowing said buffer material to harden so as to provide a bead of buffer material on the peripheral mating edge of the first trim part;

allowing the bead to mechanically lock to the first trim part by hardening of the buffer material within the recess; and supporting the first and second trim parts adjacent one another with the second trim part contacting the bead of buffer material such that the bead is compressed between the first and second trim parts wherein the buffer material does not adhere to the second trim part.

2. The method of claim 1, in which the applicator comprises an extrusion head, and the buffer material is extruded through the extrusion head.

3. The method of claim 1 in which the step of providing buffer material includes providing an elastomeric material.

4. The method of claim 1 in which the step of providing buffer material includes selecting the buffer material from a group consisting of thermoplastic elastomers and thermosetting elastomers.

5. The method of claim 4 in which the step of providing buffer material includes selecting thermoplastic urethane as a buffer material.

6. The method of claim 1 in which the robot operatively connected to the recess-forming tool and the robot operatively connected to the applicator are the same and operating the robot to simultaneously move the forming tool into and along the mating edge of the first trim part while moving the applicator in spaced generally parallel relationship with the mating edge and in trailing relationship to the recess-forming tool, the trailing applicator providing buffer material in the recess formed by the preceding forming tool so as to overfill the recess and provide a bead of buffer material on the mating edge of the first trim part.

7. The method of claim 1 in which the recess-forming tool comprises a router having a router bit configured to form a recess of desired cross sectional shape.

8. The method of claim 1 including the additional step of locating the second trim part in an opening in the first trim part, the mating edges being an outer peripheral edge of the second trim part and an inner edge of the first trim part surrounding and defining the opening in the first trim part, the additional step following the step of allowing the buffer material to mechanically lock to the first trim part.

* * * * *